US012649833B2

(12) United States Patent
Shiobara et al.

(10) Patent No.: US 12,649,833 B2
(45) Date of Patent: Jun. 9, 2026

(54) CARBON FIBER COMPOSITE MATERIAL

(71) Applicant: Shin-Etsu Chemical Co., Ltd., Tokyo (JP)

(72) Inventors: Toshio Shiobara, Tokyo (JP); Ryo Tanaka, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 233 days.

(21) Appl. No.: 18/208,141

(22) Filed: Jun. 9, 2023

(65) Prior Publication Data

US 2023/0399478 A1 Dec. 14, 2023

(30) Foreign Application Priority Data

Jun. 14, 2022 (JP) ................................ 2022-095871

(51) Int. Cl.

| | |
|---|---|
| ***C08J 5/24*** | (2006.01) |
| ***B32B 5/02*** | (2006.01) |
| ***B32B 5/26*** | (2006.01) |
| ***B32B 27/12*** | (2006.01) |
| ***B32B 27/34*** | (2006.01) |
| ***B32B 27/42*** | (2006.01) |

(52) U.S. Cl.

CPC ............... *C08J 5/243* (2021.05); *B32B 5/022* (2013.01); *B32B 5/26* (2013.01); *B32B 5/265* (2021.05); *B32B 27/12* (2013.01); *B32B 27/34* (2013.01); *B32B 27/42* (2013.01); *B32B 2250/20* (2013.01); *B32B 2260/023* (2013.01); *B32B 2260/046* (2013.01); *B32B 2262/106* (2013.01); *B32B 2307/212* (2013.01); *B32B 2307/558* (2013.01); *B32B 2307/7242* (2013.01); *B32B 2457/00* (2013.01); *B32B 2605/00* (2013.01); *C08J 2379/08* (2013.01)

(58) Field of Classification Search

None

See application file for complete search history.

(56) References Cited

U.S. PATENT DOCUMENTS

| | | | | |
|---|---|---|---|---|
| 8,847,074 | B2 | 9/2014 | Mann et al. | |
| 9,396,829 | B2 | 7/2016 | Mann et al. | |
| 2010/0000754 | A1 | 1/2010 | Mann et al. | |
| 2012/0177926 | A1 | 7/2012 | Mann et al. | |
| 2015/0107890 | A1 | 4/2015 | Mann et al. | |
| 2022/0080681 | A1* | 3/2022 | Ghazizadeh .............. | B32B 5/26 |

FOREIGN PATENT DOCUMENTS

| | | | |
|---|---|---|---|
| CN | 102785437 | A | 11/2012 |
| CN | 104527173 | A | 4/2015 |
| EP | 2 687 364 | A1 | 1/2014 |
| JP | 2008-218859 | A | 9/2008 |
| JP | 2009-144000 | A | 7/2009 |
| JP | 2012-174833 | A | 9/2012 |
| JP | 6182176 | B2 | 8/2017 |

OTHER PUBLICATIONS

Japanese Office Action for Japanese Application No. 2023-085125, dated Dec. 9, 2025, with English translation.

* cited by examiner

*Primary Examiner* — Arti Singh-Pandey

(74) *Attorney, Agent, or Firm* — Birch, Stewart, Kolasch & Birch, LLP

(57) ABSTRACT

Provided is a carbon fiber composite material having an electromagnetic wave shielding property and an excellent impact resistance. The carbon fiber composite material has one or more carbon fiber layers and one or more carbon nanotube unwoven cloth layers, wherein at least one of the carbon fiber and carbon nanotube unwoven cloth layers in the carbon fiber composite material is impregnated with a heat-curable resin or has a heat-curable resin film laminated thereon.

13 Claims, No Drawings

CARBON FIBER COMPOSITE MATERIAL

BACKGROUND OF THE INVENTION

Field of the Invention

The present invention relates to a carbon fiber composite material; particularly to a carbon fiber composite material having an electromagnetic wave shielding property and an excellent impact resistance, that is suitable for use in, for example, high-speed communication devices employing millimeter waves, terahertz-band electromagnetic waves or the like, lighter-weight vehicles intended to reduce carbon dioxide emission and improve fuel consumption, and connected cars.

Background Art

Conventionally, fiber-reinforced composite materials composed of reinforcing fibers and matrix resins have been used in many fields such as those of aerospace, vehicles, railroad vehicles, vessels, civil engineering and construction, and sporting goods, as being light and superior in mechanical properties such as strength and rigidity, heat resistance, and corrosion resistance.

Further, in the field of vehicles or the like, as electrification advances and for the sake of further improvement in fuel consumption accordingly, fiber-reinforced composite materials are now required to ensure a compatibility between impact resistance and further reduction in weight.

Moreover, in recent years, studies are being made on how to put high-speed communication such as 5G and 6G utilizing millimeter waves and terahertz-band electromagnetic waves to practical use in the days ahead. There are now more wireless devices using electromagnetic waves for communication; the ever-increasing electromagnetic waves shall lead to a risk of malfunction as a result of having an electronic device interfered with by the electromagnetic waves therearound, and a risk of information leakage due to the electromagnetic waves the electronic device emits in and of itself. Further, in order to propel the rapidly advancing technology of automated driving of vehicles or the like, transmission and reception of electromagnetic waves has to take place properly under various electromagnetic environments ranging from low-frequency electromagnetic waves to millimeter waves.

In this regard, developing an electromagnetic wave shielding measure has become a critical technical challenge, where desired is an electromagnetic wave shielding material having a superior electromagnetic wave shielding capability with respect to micro, millimeter and terahertz waves. Sophistication of electromagnetic wave use has also led to higher needs for novel functions of an electromagnetic wave shielding material, such as a smaller film thickness, a reduced weight and a larger area thereof.

As for resin-impregnated carbon fiber-reinforced composite materials employing carbon fibers as reinforcing fibers, since they are lighter than metals, the materials are being considered as substitutes for metals in improving fuel consumptions of electric vehicles and so on, and have been put to practical use in certain areas.

However, since these resin-impregnated carbon fiber-reinforced composite materials have an unsatisfactory toughness and electromagnetic wave shielding property as compared to metals, there is a limitation in their use as vehicle body structural materials.

As electromagnetic wave shielding materials, there have been proposed many electromagnetic wave shielding techniques using materials other than metal materials, such as carbon black, graphene, carbon nanotubes, electrically conductive polymers and dielectric oxides. Particularly, carbon nanotubes made of carbon have gained attention as a prospective electromagnetic wave shielding material.

As electromagnetic wave shielding materials using carbon nanotubes, there are known, for example, a paste material with carbon nanotubes being dispersed in a resin (JP-A-2009-144000), and an aqueous paint with carbon nanotubes being dispersed in an aqueous solution (JP-A-2012-174833); each of these materials is difficult to handle and does not have a sufficient electromagnetic wave shielding capability, which makes them unfit for use at practical level. Since the carbon nanotubes used in these materials are in a fine fibrous form, the large surface area thereof prevents them from being dispersed in a resin by a large amount, which causes such electromagnetic wave shielding materials using carbon nanotubes to also exhibit an insufficient electric conductivity.

Further, there is known an electromagnetic wave shielding material using a carbon nanotube sheet formed via charge spinning (JP-A-2008-218859); the problem with this material is that it is difficult to handle due to its poor strength.

There is also disclosed an electromagnetic wave shielding material that has had its conductivity improved by adding a protonating agent such as hydronium ions and hydrochloric acid to a carbon nanotube sheet, and further adding a ferromagnetic material such as iron and/or cobalt thereto (Japanese Patent No. 6182176); the handling of this material is problematic as the protonating agent is a strongly acidic compound.

SUMMARY OF THE INVENTION

Thus, it is an object of the present invention to provide a carbon fiber composite material having both an excellent electromagnetic wave shielding property and an excellent impact resistance.

The inventors of the present invention diligently conducted a series of studies to solve the aforementioned problems, and completed the invention by finding that the carbon fiber composite material described below was able to achieve the above object.

That is, the present invention is to provide the following carbon fiber composite material.

[1]

A carbon fiber composite material comprising one or more carbon fiber layers and one or more carbon nanotube unwoven cloth layers, wherein at least one of the carbon fiber and carbon nanotube unwoven cloth layers in the carbon fiber composite material is impregnated with a heat-curable resin or has a heat-curable resin film laminated thereon.

[2]

The carbon fiber composite material according to [1], comprising:

one or more layers of a heat-curable resin-containing carbon fiber prepreg with carbon fibers being impregnated with a heat-curable resin or with a heat-curable resin film being laminated on the carbon fibers; and one or more layers of a heat-curable resin-containing carbon nanotube unwoven cloth prepreg with a carbon nanotube unwoven cloth being impregnated with a heat-curable resin or with a heat-curable resin film being laminated on the carbon nanotube unwoven cloth.

[3]

The carbon fiber composite material according to [2], wherein a ratio of [number of layers of heat-curable resin-containing carbon fiber prepreg/number of layers of heat-curable resin-containing carbon nanotube unwoven cloth prepreg] in the carbon fiber composite material is 0.5 to 10.

[4]

The carbon fiber composite material according to any one of [1] to [3], wherein the carbon nanotube unwoven cloth is an unwoven cloth composed of multi-walled carbon nanotubes alone, single-walled carbon nanotubes alone, or a mixture of multi-walled carbon nanotubes and single-walled carbon nanotubes.

[5]

The carbon fiber composite material according to any one of [1] to [4], wherein the carbon nanotube unwoven cloth is a carbon nanotube unwoven cloth with a multi-walled carbon nanotube unwoven cloth and a single-walled carbon nanotube unwoven cloth being laminated together.

[6]

The carbon fiber composite material according to any one of [1] to [5], wherein the carbon nanotube unwoven cloth has a thickness of not larger than 1 mm, an air permeability of not larger than 0.5 $cm^3/cm^2 \cdot s$, and a specific resistance of not larger than 0.005 $\Omega \cdot cm$.

The carbon fiber composite material of the present invention has both an excellent electromagnetic wave shielding property and an excellent impact resistance, and is also superior in handling property since the material employs no strongly acidic compound such as a protonating agent. Thus, the carbon fiber composite material of the present invention is a material suitable for use in high-speed communication devices utilizing electromagnetic waves in high-frequency bands that are as high as or higher than those of millimeter waves, and is also useful as a vehicle body structural material or in-vehicle material enabling weight reduction and fuel consumption reduction since the material itself is light.

DETAILED DESCRIPTION OF THE INVENTION

The present invention is described in detail hereunder.

A carbon fiber composite material of the present invention has one or more carbon fiber layers and one or more carbon nanotube unwoven cloth layers, where at least one of the carbon fiber and carbon nanotube unwoven cloth layers in this carbon fiber composite material is impregnated with a heat-curable resin or has a heat-curable resin film laminated thereon. Preferably, the carbon fiber composite material is one having one or more layers of a heat-curable resin-containing carbon fiber prepreg with carbon fibers being impregnated with a heat-curable resin or with a heat-curable resin film being laminated on the carbon fibers; and one or more layers of a heat-curable resin-containing carbon nanotube unwoven cloth prepreg with a carbon nanotube unwoven cloth being impregnated with a heat-curable resin or with a heat-curable resin film being laminated on the carbon nanotube unwoven cloth.

Carbon Fibers

The carbon fibers used in the present invention may, for example, be acrylic carbon fibers, pitch-based carbon fibers, rayon-based carbon fibers and the like, of which particularly preferred are acrylic carbon fibers having a high tensile strength.

Such acrylic carbon fibers may, for example, be produced by the steps described below. That is, spinning is performed from a spinning dope containing polyacrylonitrile obtained from a monomer whose main component is acrylonitrile, using a wet spinning method, a dry and wet spinning method, a dry spinning method or a melt spinning method. Coagulated yarns obtained after spinning are then subjected to a yarn-making process so as to be turned into precursors, followed by carrying out a flameproofing step, a carbonizing step and the like to obtain carbon fibers.

There are no restrictions on the configuration and arrangement of the carbon fibers. For example, there may be used the configurations of: continuous fibers aligned and arranged in one direction; a single tow; fabrics such as a plain-woven fabric, a sateen-woven fabric and a twill-woven fabric; and fiber structures such as a knit, an unwoven cloth, a mat and a braid. Among them, preferred are the configuration of continuous fibers aligned and arranged in one direction, or the configuration of a fabric such as a plain-woven fabric, a sateen-woven fabric and a twill-woven fabric, and it is preferred that the carbon fiber layer be formed of such type of carbon fibers. Here, continuous fibers refer to fibers having a length of not shorter than 10 mm on average.

In order for these carbon fibers to possess the configuration of continuous fibers or a fabric, the carbon fibers may be those that have already had their surfaces treated with a sizing agent. The sizing agent may, for example, be an epoxy resin, a polyimide resin, a bismaleimide resin or the like; a treatment method using such sizing agent may, for example, be one where the surfaces of the carbon fibers are previously treated with at least one of these resins that is dissolved in a solvent.

It is preferred that the carbon fibers used in the present invention have a basis weight of 1 to 1,000 $g/m^2$, more preferably 10 to 800 $g/m^2$, even more preferably 100 to 500 $g/m^2$. It is preferable if the carbon fibers have a basis weight of not smaller than 1 $g/m^2$, because there will be exhibited a high mechanical strength, and an excellent impact resistance and electromagnetic wave-shielding property. Further, it is preferable if the carbon fibers have a basis weight of not larger than 1,000 $g/m^2$, because there will be exhibited a moderate flexibility, and the carbon fibers will have a moderate porosity so that an anchoring effect will manifest as a result of impregnating the carbon fibers with a heat-curable resin, whereby an excellent adhesion to the heat-curable resin will be exhibited.

Further, there may be used only one kind of carbon fibers, or two or more kinds of carbon fibers in combination. The carbon fibers may be combined with other reinforcement fibers selected from glass fibers, aramid fibers, boron fibers, PBO fibers, liquid crystal polyester fibers, high-strength polyethylene fibers, alumina fibers, silicon carbide fibers and the like; in such case, the carbon fibers are present at a ratio of not smaller than 5% by mass, preferably 10 to 100% by mass.

It is preferred that the carbon fibers have a tensile elastic modulus of 200 to 440 GPa. It is preferable when the tensile elastic modulus of the carbon fibers is within this range, because the carbon fiber composite material will exhibit a high rigidity and strength as well as a favorable balance between the two. The tensile elastic modulus is more preferably in a range of 230 to 400 GPa, even more preferably in a range of 260 to 370 GPa.

It is preferred that the carbon fibers have a tensile elongation of 0.8 to 3.0%. It is preferable when the tensile elongation of the carbon fibers is within this range, because the carbon fiber composite material will exhibit an excellent tensile strength, tensile elastic modulus and impact resistance as well as a favorable balance between the three. The tensile elongation of the carbon fibers is more preferably in a range of 1.0 to 2.5%, even more preferably in a range of 1.2 to 2.3%.

Here, the tensile elastic modulus and tensile elongation of the carbon fibers are values measured in accordance with JIS R 7606:2000.

It is preferred that the carbon fibers used in the present invention be those where there are 2,500 to 50,000 filaments in each fiber bundle. It is preferable if there are 2,500 or more filaments, because there will be exhibited an excellent strength. Further, it is preferable if there are 50,000 or less filaments, because it will be easy to moderately impregnate the fibers with a later-described heat-curable resin. It is more preferred that there are 2,800 to 40,000 filaments in each fiber bundle of the carbon fibers.

Examples of commercially available carbon fibers include "Torayca (registered trademark)" cloth CO6343 (by Toray Industries, Inc.), "Torayca (registered trademark)" cloth CK6244C (by Toray Industries, Inc.), "PYROFIL (registered trademark)" TR3110M (by Mitsubishi Chemical Corporation), and "PYROFIL (registered trademark)" TR6110M (by Mitsubishi Chemical Corporation), as typical fabrics.

Carbon Nanotube Unwoven Cloth

The carbon nanotube unwoven cloth used in the present invention is one with single to multi-walled carbon nanotube fibers having a diameter of not larger than 50 nm and a length of not larger than 2 mm, preferably 10 to 500 μm being intertwined with one another; the unwoven cloth itself preferably has a thickness of not larger than 1 mm. The carbon nanotube unwoven cloth used in the present invention may be one in which the carbon nanotube fibers are composed of single-walled carbon nanotubes; one in which the carbon nanotube fibers are composed of multi-walled carbon nanotubes; or one in which the carbon nanotube fibers are composed of both single- and multi-walled carbon nanotubes in a mixed manner. Further, the carbon nanotube unwoven cloth may be one with a multi-walled carbon nanotube unwoven cloth and a single-walled carbon nanotube unwoven cloth being laminated together.

It is preferred that the carbon nanotube unwoven cloth used in the present invention have a basis weight of 1 to 1,000 $g/m^2$, more preferably 2 to 500 $g/m^2$, even more preferably 5 to 100 $g/m^2$. It is preferable if the carbon nanotube unwoven cloth have a basis weight of not smaller than 1 $g/m^2$, because there will be exhibited a high mechanical strength, and an excellent impact resistance and electromagnetic wave-shielding property. Further, it is preferable if the carbon nanotube unwoven cloth have a basis weight of not larger than 1,000 $g/m^2$, because there will be exhibited an excellent balance between electromagnetic wave-shielding property and flexibility.

For the sake of improving electric conductivity, preferred is a highly conductive carbon nanotube unwoven cloth having an air permeability of not larger than 0.5 $cm^3/cm^2 \cdot s$, and a specific resistance of not larger than 0.005 Ω·cm, preferably not larger than 0.003 Ω·cm.

The carbon nanotube unwoven cloth is one prepared by intertwining carbon nanotube fibers obtained by known methods, such as carbon nanotube fibers spun by a plasma furnace using a hydrocarbon gas such as a methane gas, and carbon nanotube fibers spun through a fine hole after dissolving carbon nanotubes.

Air permeability can be adjusted by for example pressurizing the carbon nanotube unwoven cloth, where the intertwinement of the carbon nanotube fibers and the thickness of the carbon nanotube unwoven cloth are adjusted. In this specification, air permeability is a value of an air permeability of the cloth that is measured by a Frazier type tester in accordance with JIS R 3420.

A carbon nanotube unwoven cloth preferably having an air permeability of not larger than 0.5 $cm^3/cm^2 \cdot s$, more preferably not larger than 0.1 $cm^3/cm^2 \cdot s$, even more preferably not larger than 0.05 $cm^3/cm^2 \cdot s$ is preferrable as it also has a favorable electric conductivity and exhibits an excellent electromagnetic wave shielding performance in a wide range of frequencies (10 kHz to 300 GHz).

As a carbon nanotube unwoven cloth having the above-mentioned characteristics, there may, for example, be listed the following commercially available products.

(1) CNTM10 by Tortech Nano Fibers
thickness 32 μm, air permeability 0.04 $cm^3/cm^2 \cdot s$, specific resistance 2.22E-03 (Ω·cm)

(2) CNTM30 by Tortech Nano Fibers
thickness 78 μm, air permeability 0.01 $cm^3/cm^2 \cdot s$, specific resistance 1.51E-03 (Ω·cm)

(3) MIRALON (registered trademark) by Huntsman Corporation
thickness 20 μm, air permeability 0.05 $cm^3/cm^2 \cdot s$, specific resistance 3.5E-03 (Ω·cm)

(4) Single-walled carbon nanotube unwoven cloth by MEIJO NANO CARBON Co., Ltd.
thickness 50 μm, air permeability 0.01 $cm^3/cm^2 \cdot s$, specific resistance 1.82E-04 (Ω·cm)

Heat-Curable Resin

As a heat-curable resin serving as a binder of the carbon fibers and/or the carbon nanotube unwoven cloth, there may be employed a heat-curable resin(s) selected from the group consisting of an epoxy resin, a phenolic resin, an allylated epoxy resin, an allylated polyphenylene ether resin, a maleimide resin, a bismaleimide resin, a cyanate resin, a cyclopentadiene-styrene copolymer resin, a silicone resin, an acrylic resin, and a polyester resin.

Particularly, as the heat-curable resin used in the present invention, preferred are one or more kinds of resins selected from the following epoxy resins, bismaleimide resins and cyanate ester resins.

The epoxy resin is preferably exemplified by an epoxy resin having at least two glycidyl groups per molecule.

Examples of the epoxy resin used in the present invention include bisphenol-type epoxy resins such as a bisphenol A-type epoxy resin, a bisphenol F-type epoxy resin, a bisphenol AD-type epoxy resin, and a bisphenol S-type epoxy resin; biphenyl frame-containing epoxy resins; naphthalene frame-containing epoxy resins; dicyclopentadiene frame-containing epoxy resins; novolac-type epoxy resins such as a phenol novolac-type epoxy resin and a cresol novolac-type epoxy resin; polyfunctional epoxy resins; glycidyl amine-type epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4 '-methylenedi aniline, N,N,N',N'-tetraglycidyl-m-xylylenediamine, N,N-diglycidylaniline, and N,N-diglycidyl-o-toluidine; resorcinol diglycidyl ether; and triglycidyl isocyanurate.

Any one of these epoxy resins may be used alone, or multiple of them may be used in a mixed manner.

If using an epoxy resin as the heat-curable resin, it is preferred that there also be used a curing agent for epoxy resin; as such curing agent for epoxy resin, any curing agent may be used so long as it is a curing agent having active hydrogen-containing phenolic hydroxyl groups or amino groups, and forming crosslinked structures with epoxy resins. As a phenolic hydroxyl group-containing curing agent, there may be used a curing agent of any structure so long as it is a phenolic hydroxyl group-containing phenolic resin. As an amino group-containing curing agent, preferred is an aromatic amine curing agent with which there can be obtained an epoxy resin cured product having a high heat resistance and a high elastic modulus. Specific examples of such aromatic amine curing agent include solid aromatic amine curing agents such as 4,4'-diaminodiphenylmethane, 3,3'-diaminodiphenylsulfone, 4,4'-diaminodiphenylsulfone, 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, and 3,3',5,5'-tetramethyl-4,4'-diaminodiphenylmethane; 2,2'-diethyldiaminodiphenylmethane; diethyltoluenediamines such as 2,4-diethyl-6-methyl-m-phenylenediamine and 4,6-diethyl-2-methyl-m-phenylenediamine; liquid aromatic amine curing agents such as 4,4'-methylenebis(N-methylaniline), 4,4'-methylenebis(N-ethylaniline), 4,4'-methylenebis(N-sec-butylaniline), and N,N'-di-sec-butyl-p-phenylenediamine; or mixtures of solid and liquid aromatic amine curing agents.

Among them, particularly preferred are 3,3'-diaminodiphenylsulfone, 4,4'-diaminodiphenylsulfone, 3,3'-diisopropyl-4,4'-diaminodiphenylmethane, 3,3',5,5'-tetramethyl-4,4'-diaminodiphenylmethane, 3,3'-diisopropyl-5,5'-diethyl-4,4'-diaminodiphenylmethane, and 3,3',5,5'-tetraethyl-4,4'-diaminodiphenylmethane.

The phenolic hydroxyl group-containing phenolic resin is added in an amount at which the molar equivalent of the phenolic hydroxyl groups will preferably be 0.1 to 2.0, more preferably 0.2 to 1.8, particularly preferably 0.4 to 1.5, per 1 molar equivalent of the epoxy groups contained in the epoxy resin(s). When such equivalent is smaller than 0.1, unreacted epoxy groups will remain, which may impair adhesion; when such equivalent is larger than 2.0, unreacted phenolic hydroxyl groups will remain, which may lead to a deterioration in strength when stored under a high temperature.

Further, the aromatic amine curing agent is added in an amount at which the equivalent of all the amino groups in the aromatic amine curing agent(s) will preferably be 0.7 to 1.5, more preferably 0.7 to 1.2, even more preferably 0.7 to 1.1, particularly preferably 0.85 to 1.05, per 1 molar equivalent of the epoxy groups. When such equivalent is smaller than 0.7, unreacted epoxy groups will remain, which may lead to a lowered glass-transition temperature or an impaired adhesion; when such equivalent is larger than 1.5, the cured product will become hard and brittle so that cracks may occur at the time of performing reflow or undergoing temperature cycles.

One kind of curing agent for epoxy resin may be used alone, or two or more kinds thereof may be used in combination.

As the bismaleimide resin, preferred is a bismaleimide resin represented by the following formula (1) or (2) as being superior in heat resistance, low elasticity, toughness and adhesion.

(1)

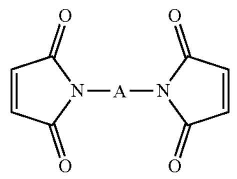

In the formula (1), A represents a dimer acid frame-derived hydrocarbon group.

(2)

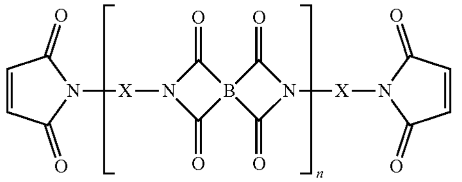

In the formula (2), B independently represents a tetravalent organic group having a cyclic structure; X independently represents a divalent hydrocarbon group having 6 to 200 carbon atoms, where at least one X represents a dimer acid frame-derived hydrocarbon group; n is 1 to 100.

A dimer acid refers to a liquid dibasic acid whose main component is a dicarboxylic acid having 36 carbon atoms, which is produced by dimerizing an unsaturated fatty acid having 18 carbon atoms and employing a natural substance such as a vegetable fat or oil as its raw material; a dimer acid may contain multiple structures as opposed to one single type of frame, and there exist several types of isomers. Typical dimer acids are categorized under the names of linear type, monocyclic type, aromatic ring type, and polycyclic type. In this specification, a dimer acid frame refers to a group induced from a dimer diamine having a structure established by substituting the carboxy groups in a dimer acid with primary aminomethyl groups. A dimer acid frame-derived hydrocarbon group may be expressed as $-C_{36}H_{70}-$ in terms of an average structure thereof.

A typical example of the bismaleimide resin of the formula (1) may be SLK-6895 produced by Shin-Etsu Chemical Co., Ltd.

In the formula (2), B independently represents a tetravalent organic group having a cyclic structure; particularly, it is preferred that B be any one of the tetravalent organic groups represented by the following structural formulae.

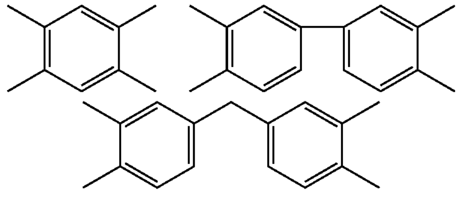

-continued

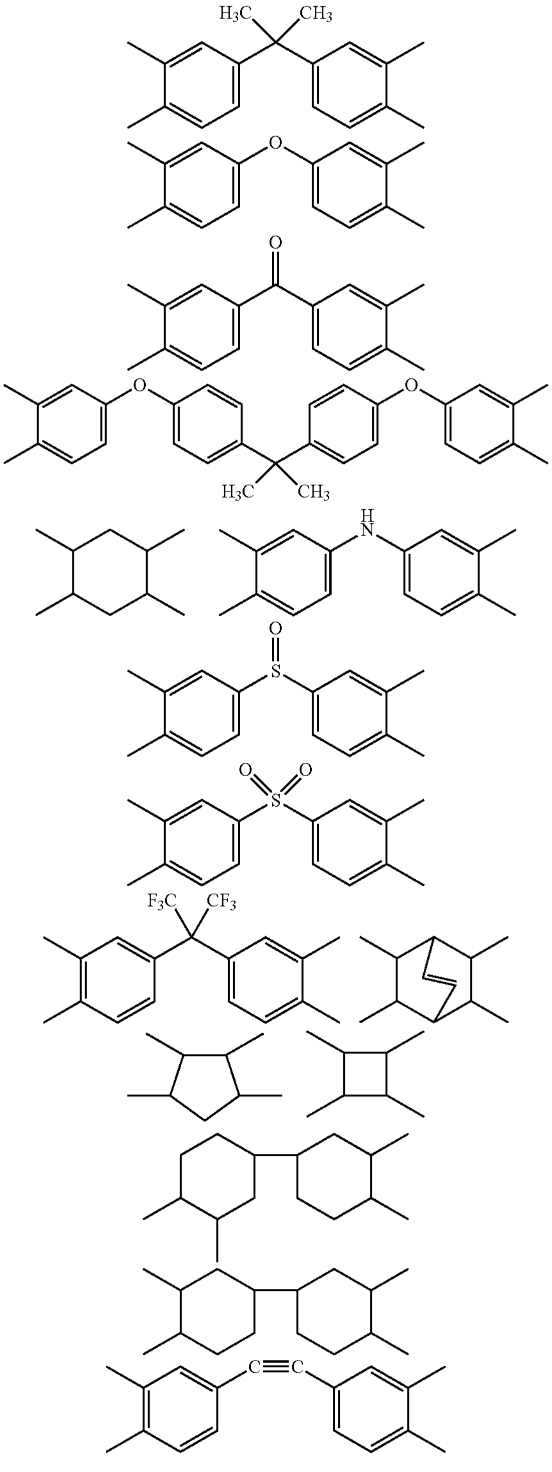

Bonds in the above structural formulae that are yet unbonded to substituent groups are to be bonded to carbonyl carbons forming cyclic imide structures in the formula (2).

Further, in the formula (2), X independently represents a divalent hydrocarbon group having 6 to 200, preferably 8 to 100, more preferably 10 to 50 carbon atoms. Particularly, it is preferred that X be a branched divalent hydrocarbon group with at least one hydrogen atom in the above divalent hydrocarbon group being substituted by an alkyl or alkenyl group(s) having 6 to 200, preferably 8 to 100, more preferably 10 to 50 carbon atoms. The branched divalent hydrocarbon group may be either a saturated aliphatic hydrocarbon group or an unsaturated hydrocarbon group, and may also have an alicyclic structure or an aromatic ring structure in the midway of the molecular chain.

At least one X in the formula (2) represents a dimer acid frame-derived hydrocarbon group.

In the formula (2), n is 1 to 100, preferably 1 to 60, more preferably 1 to 50. When n is too large, a solubility and fluidity will be impaired, which may then impair a moldability such as lamination and impregnation properties.

A typical example of the bismaleimide resin of the formula (2) may be a bismaleimide resin represented by the following formula (4) (SLK-3000 produced by Shin-Etsu Chemical Co., Ltd.).

(4)

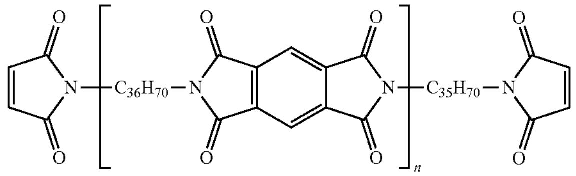

n≈5 (Average value)

One kind of each of the bismaleimide resins represented by the formulae (1) and (2) may be used alone, or two or more kinds thereof may be used in combination.

Other than the SLK-6895 (by Shin-Etsu Chemical Co., Ltd.) and the SLK-3000 (by Shin-Etsu Chemical Co., Ltd.), typical examples of the bismaleimide resin may also include the SLK-2000 series (by Shin-Etsu Chemical Co., Ltd.).

If using a bismaleimide resin as the heat-curable resin, it is preferred that there also be used, as a curing catalyst, a reaction initiator for bismaleimide resin. There are no particular restrictions on such reaction initiator for bismaleimide resin so long as it is capable of promoting a crosslinking reaction, examples of which may include ionic catalysts such as imidazoles, an organic phosphorus-based compound, tertiary amines, quaternary ammonium salts, a boron trifluoride-amine complex, organophosphines, and an organophosphonium salt; organic peroxides such as diallyl peroxide, dialkyl peroxide, peroxide carbonate, and hydroperoxide; and radical polymerization initiators such as azoisobutyronitrile.

Particularly, an organic peroxide is preferred, examples of which may include dicumyl peroxide, t-butyl peroxybenzoate, t-amyl peroxybenzoate, dibenzoyl peroxide, dilauroyl peroxide, 2,5-dimethyl-2,5-di(t-butylperoxy)hexane, 1,1-di (t-butylperoxy)cyclohexane, di-t-butyl peroxide, and dibenzoyl peroxide.

The reaction initiator is preferably added in an amount of 0.05 to 10 parts by mass, more preferably 0.1 to 5 parts by mass, per 100 parts by mass of the bismaleimide resin(s).

One kind of such reaction initiator may be used alone, or two or more kinds thereof may be used in combination.

The cyanate ester resin is a cyanate ester compound having at least two cyanato groups per molecule.

A commonly known compound may be used as such cyanate ester compound having at least two cyanato groups per molecule; a cyanate ester compound represented by the following formula (5) is preferred.

(5)

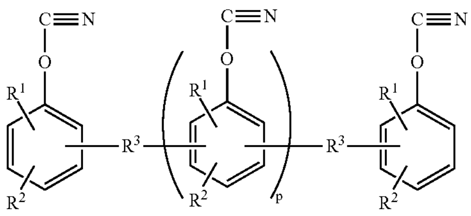

In the formula (5), each of $R^1$s and $R^2$s independently represents a hydrogen atom or an alkyl group having 1 to 4 carbon atoms; each R3 independently represents a divalent linking group selected from the group consisting of those represented by the following formulae; p is a number satisfying p=0 to 10.

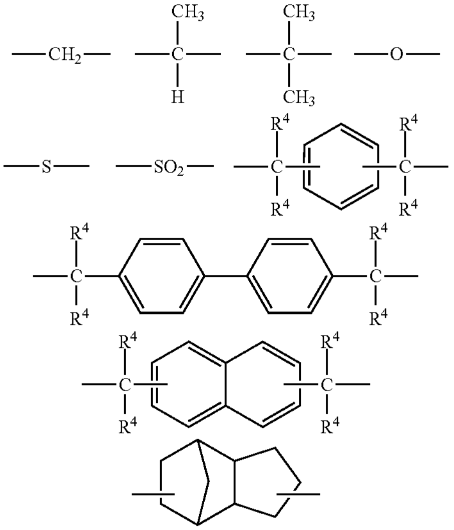

Each $R^4$ in the above formulae independently represents a hydrogen atom or a methyl group.

Specific examples of the cyanate ester resin include the following cyanate ester compounds. For example, there may be listed bis(4-cyanatophenyl)methane, bis(3-methyl-4-cyanatophenyl)methane, bis(3,5-dimethyl-4-cyanatophenyl)methane, 1,1-bis(4-cyanatophenyl)ethane, 2,2-bis(4-cyanatophenyl)propane, 1,3-dicyanatobenzene, 1,4-dicyanatobenzene, 2-tert-butyl-1,4-dicyanatobenzene, 2,4-dimethyl-1,3-dicyanatobenzene, 2,5-di-tert-butyl-1,4-dicyanatobenzene, tetramethyl-1,4-dicyanatobenzene, 1,3,5-tricyanatobenzene, 2,2'-dicyanatobiphenyl, 4,4'-dicyanatobiphenyl, 3,3',5,5'-tetramethyl-4,4'-dicyanatobiphenyl, 1,3-dicyanatonaphthalene, 1,4-dicyanatonaphthalene, 1,5-dicyanatonaphthalene, 1,6-dicyanatonaphthalene, 1,8-dicyanatonaphthalene, 2,6-dicyanatonaphthalene, 2,7-dicyanatonaphthalene, 1,3,6-tricyanatonaphthalene, bis(4-cyanatophenyl)ether, 4,4'-(1,3-phenylenediisopropylidene)diphenylcyanate, bis(4-cyanatophenyl)thioether, tris(4-cyanato-phenyl)phosphine, a bisphenol E-type cyanate ester, a phenol novolac-type cyanate, a cresol novolac-type cyanate, bis(3-ethyl-4-cyanatophenyl)methane, bis(4-cyanatophenyl)sulfone, 1,1,1-tris(4-cyanatophenyl)ethane, 2,2-bis(4-cyanatophenyl)-1,1,1,3,3,3-hexafluoropropane, a diallyl bisphenol A-type cyanate ester, a diallyl bisphenol F-type cyanate ester, a biphenyl aralkyl-type cyanate ester, a dicyclopentadiene novolac-type cyanate, a naphthalene ring-containing cyanate ester, an aralkyl-type cyanate ester, and a heterocyclic cyanate ester. There may be used one kind of these cyanate ester compounds, or two or more kinds of them may be used in a mixed manner. Particularly, preferable cyanate ester compounds are bis(4-cyanatophenyl)methane, bis(3-methyl-4-cyanatophenyl)methane, 1,1-bis(4-cyanatophenyl)ethane, and a phenol novolac-type cyanate ester. More preferable cyanate ester compounds are 1,1-bis(4-cyanatophenyl)ethane and a phenol novolac-type cyanate ester. Further, one kind of such cyanate ester compound may be used alone, or multiple kinds thereof may be used in combination.

It is preferable if the viscosity of the cyanate ester compound is not higher than 300 Pa·s, because a cyanate ester compound having such viscosity has an excellent fluidity and an excellent impregnation property with respect to the carbon fibers and carbon nanotube unwoven cloth, which allows curing to take place in a uniform manner easily.

Here, the viscosity of the cyanate ester compound is a value measured by a B-type rotary viscometer at room temperature (23 to 30° C.) in accordance with a method described in JIS K7117-1:1999.

If using a cyanate ester resin as the heat-curable resin, it is preferred that there also be used a curing agent for cyanate ester resin. There may be used any curing agent for cyanate ester resin so long as it is capable of reacting with a cyanate ester compound; a commonly known curing agent such as a phenolic curing agent may be used. Examples of such phenolic curing agent include a phenol novolac resin, a naphthalene ring-containing phenolic resin, an aralkyl type-phenolic resin, a triphenolalkane-type phenolic resin, a biphenyl frame-containing aralkyl-type phenolic resin, a biphenyl-type phenolic resin, an alicyclic phenolic resin, a heterocyclic phenolic resin, a naphthalene ring-containing phenolic resin, a resorcinol-type phenolic resin, an allyl group-containing phenolic resin, and a bisphenol-type phenolic resin such as a bisphenol A-type resin and a bisphenol F-type resin.

One kind of such curing agent for cyanate ester resin can be used alone, or two or more kinds thereof may be used in combination.

The phenolic curing agent is preferably added in an amount of 0.5 to 20 parts by mass, more preferably 1 to 10 parts by mass, per 100 parts by mass of the cyanate ester resin.

Further, there may also be used in combination a commonly known curing accelerator to promote curing of the cyanate ester resin. The curing accelerator may, for example, be a phosphorus-based compound, a tertiary amine compound, an imidazole compound and the like. One kind of such curing accelerator may be used alone, or two or more kinds thereof may be used in combination. The curing accelerator is preferably added in an amount of 0.1 to 10 parts by mass, more preferably 0.2 to 5.5 parts by mass, per 100 parts by mass of the cyanate ester resin.

Heat-Curable Resin-Containing Carbon Fiber Prepreg

The heat-curable resin-containing carbon fiber prepreg composing the carbon fiber composite material of the present invention is one with the carbon fibers being impregnated with the heat-curable resin or with a heat-curable resin film being laminated on such carbon fibers; preferably one with the carbon fibers being impregnated with at least one kind of heat-curable resin selected from the epoxy resin, bismaleimide resin and cyanate ester resin, or with a heat-curable resin film of at least one kind of heat-curable resin selected from the epoxy resin, bismaleimide resin and cyanate ester resin being laminated on such carbon fibers.

The at least one kind of heat-curable resin selected from the epoxy resin, bismaleimide resin and cyanate ester resin is contained in an amount of 10 to 200 parts by mass per 100 parts by mass of the carbon fibers.

Further, it is preferred that the carbon fibers be contained in the heat-curable resin-containing carbon fiber prepreg by an amount of not smaller than 50% by mass, more preferably not smaller than 60% by mass. It is preferred that the heat-curable resin(s) be contained in the heat-curable resin-containing carbon fiber prepreg by an amount of 5 to 50% by mass, more preferably 10 to 40% by mass.

As the heat-curable resin-containing carbon fiber prepreg, there may be used one produced by a later-descried method, or a commercially available product such as "PYROFIL (registered trademark)" TR3110-381GMX and "PYROFIL (registered trademark)" TR6110H331GMP (all by Mitsubishi Chemical Corporation).

Heat-Curable Resin-Containing Carbon Nanotube Unwoven Cloth Prepreg

The heat-curable resin-containing carbon nanotube unwoven cloth prepreg composing the carbon fiber composite material of the present invention is one with the carbon nanotube unwoven cloth being impregnated with the heat-curable resin or with a heat-curable resin film being laminated on such carbon nanotube unwoven cloth; preferably one with the carbon nanotube unwoven cloth being impregnated with at least one kind of heat-curable resin selected from the epoxy resin, bismaleimide resin and cyanate ester resin, or with a heat-curable resin film of at least one kind of heat-curable resin selected from the epoxy resin, bismaleimide resin and cyanate ester resin being laminated on such carbon nanotube unwoven cloth.

Further, it is preferred that the carbon nanotube unwoven cloth be contained in the heat-curable resin-containing carbon nanotube unwoven cloth prepreg by an amount of not smaller than 50% by mass, more preferably not smaller than 70% by mass. It is preferred that the heat-curable resin(s) be contained in the heat-curable resin-containing carbon nanotube unwoven cloth prepreg by an amount of 5 to 50% by mass, more preferably 10 to 30% by mass.

As the heat-curable resin-containing carbon nanotube unwoven cloth prepreg, there may be used one produced by a later-described method, or a commercially available product.

The carbon fiber composite material of the present invention may further contain the following components as optional components.

Thermoplastic Resin

In addition to the heat-curable resin, the carbon fibers and/or the carbon nanotube unwoven cloth may further be impregnated with a thermoplastic resin, or a thermoplastic resin-containing heat-curable resin film may be laminated on the carbon fibers and/or the carbon nanotube unwoven cloth. Typical examples of such thermoplastic resin include polyethylene, polypropylene, polyphenylene ether, polyetheretherketone, polyetherketone, polyethersulfone, and fluorine resin. Particularly, a solvent-soluble thermoplastic resin is preferable for impregnating the carbon fibers and/or the carbon nanotube unwoven cloth.

If adding a thermoplastic resin, it is preferred that the thermoplastic resin be added in an amount of 0 to 50 parts by mass per 100 parts by mass of the heat-curable resin(s).

Coupling Agent

In the present invention, a coupling agent may be used to improve a wettability and adhesion strength between the resin(s) and the carbon fibers and/or carbon nanotube unwoven cloth.

Examples of such coupling agent may include silane coupling agents, and alkoxide-based compounds such as a titanium alkoxide compound and an aluminum alkoxide compound. Particularly, a silane coupling agent is preferred, and a preferable silane coupling agent may, for example, be a compound represented by a general formula $Y—Si—X_3$. Here, Y is an organic group having a functional group as typified by, for example, an amino group, an epoxy group, a hydroxyl group, a carboxyl group, a vinyl group, a methacryl group and a mercapto group; X is a hydrolyzable functional group as typified by an alkoxy group.

Specifically, as typical examples, there may be listed γ-glycidoxypropyltrimethoxysilane, vinyltriethoxysilane, γ-aminopropyltriethoxysilane, γ-mercaptopropyltrimethoxysilane, γ-methacryloxypropyltrimethoxysilane, γ-aminobenzyltriethoxysilane, γ-aminophenyltriethoxysilane and the like.

It is appropriate that such coupling agent be used in an amount of 0.5 to 20 parts by mass per 100 parts by mass of the heat-curable resin(s).

Further, instead of using a coupling agent, for the purpose of improving the wettability to the heat-curable resin(s), it is also possible to treat the surfaces of the carbon fibers and/or the carbon nanotube fibers with a diluted solution of the heat-curable resin(s).

Inorganic Material

By filling the gaps between the intertwined carbon fibers or fibers of the carbon nanotube unwoven cloth that compose part of the present invention with, for example, an inorganic powder, inorganic fibers or metal particles, not only electric conductivity can be further improved, but an electromagnetic wave shielding performance in a frequency band of 10 to 300 GHz can be improved as well.

Typical examples of an inorganic powder include carbon black, carbon nanotube, graphene, graphite, silica, zinc oxide, alumina, boron nitride, aluminum nitride, short carbon fibers, and short alumina fibers. Further, metal particles may, for example, be copper particles, iron particles, silver particles, gold particles or the like; and there may be added resin particles whose surfaces are coated with these metals.

Moreover, in order to further improve the thermal conductivity of the carbon nanotube unwoven cloth and the carbon fibers, there may be used inorganic particles or fibers such as silica particles, zinc oxide particles, alumina particles, boron nitride particles, aluminum nitride particles, short carbon fibers, short alumina fibers, quartz fibers, and glass fibers. By using these materials, the thermal conductivity of the carbon nanotube unwoven cloth can be raised to 50 to 80 W/mK.

There are no particular restrictions on the shape of the inorganic material; those having an average particle size of 0.5 to 30 μm are preferable in terms of heat dissipation and electric conductivity.

Here, the average particle size of the inorganic material is a D50 value measured by a laser diffraction method.

Further, if using carbon nanotubes as the inorganic material, it is preferred, for example, that the carbon nanotubes have an average diameter of not smaller than 0.5 nm, more preferably not smaller than 1 nm; and preferably not larger than 15 nm, more preferably not larger than 10 nm. The average diameter is a value obtained by measuring the diameters (outer diameters) of 10 randomly selected carbon nanotubes, using a transmission electron microscope.

The inorganic material may be directly dispersed into the carbon fibers or the carbon nanotube unwoven cloth; or the carbon fibers or the carbon nanotube unwoven cloth may be impregnated with a heat-curable resin(s) that already has the inorganic material dispersed therein.

The inorganic material may be dispersed into the carbon fibers or the carbon nanotube unwoven cloth by any method. For example, there may be employed a method where the inorganic material is to be stuffed into the carbon fibers or the carbon nanotube unwoven cloth by a pressing device or a laminator; a method where the inorganic material is to be dispersed in any solvent, followed by spraying the dispersion onto the carbon fibers or the carbon nanotube unwoven cloth with a sprayer and then removing the solvent by drying; or even a combination of these methods.

Any solvent may be used as the solvent of the dispersion; a solvent with a high volatility is preferred, examples of which include water, an alcohol such as ethanol and isopropyl alcohol, acetone, toluene, a hydrocarbon-based solvent, and a silicone-based solvent. It is preferred that the concentration of the dispersion be 0.1 to 100 parts by mass per 100 parts by mass of the inorganic material.

If the inorganic material is to be dispersed into and immobilized in the carbon fibers or the carbon nanotube unwoven cloth, an immobilization amount is preferably 0.01 to 100 parts by mass per 100 parts by mass of the carbon fibers or the carbon nanotube unwoven cloth.

If the carbon fibers or the carbon nanotube unwoven cloth is to be impregnated with a heat-curable resin(s) that already has the inorganic material dispersed therein, or if this heat-curable resin(s) is to be laminated thereon as a heat-curable resin film, the inorganic material is preferably in an amount of 5 to 60 parts by mass, more preferably 10 to 50 parts by mass, per 100 parts by mass of the heat-curable resin(s).

Production Method

The carbon fiber composite material of the present invention can be produced by any of

- a method where the heat-curable resin-containing carbon nanotube unwoven cloth prepreg that is impregnated with the heat-curable resin or has the heat-curable resin film laminated therein is at first produced, followed by laminating such heat-curable resin-containing carbon nanotube unwoven cloth prepreg and the carbon fibers;
- a method where the heat-curable resin-containing carbon fiber prepreg that is impregnated with the heat-curable resin or has the heat-curable resin film laminated therein is at first produced, followed by laminating such heat-curable resin-containing carbon fiber prepreg and the carbon nanotube unwoven cloth; or
- a method where the heat-curable resin-containing carbon fiber prepreg and the heat-curable resin-containing carbon nanotube unwoven cloth prepreg are produced separately, followed by laminating these prepregs.

As a method for producing the heat-curable resin-containing carbon fiber prepreg, there may be listed, for example, a wet method where the viscosity of the heat-curable resin is at first lowered by dissolving it in a solvent, followed by impregnating the carbon fibers with such heat-curable resin; and a melt rolling method where the viscosity of the heat-curable resin is at first lowered by heating it, followed by impregnating the carbon fibers with such heat-curable resin.

As a method for producing the heat-curable resin-containing carbon nanotube unwoven cloth prepreg, there may be listed a wet method where the viscosity of the heat-curable resin is at first lowered by dissolving it in a solvent, followed by impregnating the carbon nanotube unwoven cloth with such heat-curable resin; and a melt rolling method where the viscosity of the heat-curable resin is at first lowered by heating it, followed by impregnating the carbon nanotube unwoven cloth with such heat-curable resin.

Further, a varnish of the heat-curable resin may be turned into a film with the aid of a coater or the like so as to obtain a heat-curable resin film, followed by laminating such heat-curable resin film on both surfaces of the carbon fibers or the carbon nanotube unwoven cloth so as to obtain a prepreg.

In the wet method, a volatile solvent is preferred whereby after impregnating the carbon fibers or the carbon nanotube unwoven cloth with the heat-curable resin, a prepreg impregnated with an uncured heat-curable resin can be obtained by removing the solvent.

Examples of such solvent include anisole, cyclohexanone, tetralin, mesitylene, xylene, toluene, tetrahydrofuran (THF), dimethylformamide (DMF), dimethylsulfoxide (DMSO), and acetonitrile; the solvent shall not be limited to these solvents depending on the heat-curable resin(s). Any one kind of these solvents may be used alone, or two or more kinds of them may be used in combination. The solvent is preferably added in an amount of 5 to 95% by mass.

There will be negative impacts at the time of molding if the solvent remains in the prepreg, which may lead to a problem of, for example, deteriorating the work environment. Thus, the amount of the solvent remaining in the prepreg is not larger than 1% by mass, preferably not larger than 0.5% by mass. Although depending on the boiling point of the solvent used, a method for removing the solvent may preferably be a heat treatment performed at 80 to 150° C. for about 10 min to 1 hour; this heat treatment allows the solvent to be removed easily.

The melt rolling method has advantages in various aspects such as the fact that the method does not particularly require a solvent removal step whereby a relatively favorable work efficiency can be achieved. In the melt rolling method, the carbon fibers or the carbon nanotube unwoven cloth is widened to a required width using a bar or the like, followed by placing and laminating the heat-curable resin that has been turned into a film on one or both surfaces of the carbon fibers or the carbon nanotube unwoven cloth before conducting heating and pressurizing, thus obtaining a prepreg impregnated with an uncured heat-curable resin.

As for the carbon fibers (heat-curable resin-containing carbon fiber prepreg) and the carbon nanotube unwoven cloth (heat-curable resin-containing carbon nanotube unwoven cloth prepreg), they may be laminated in any number of pieces and in any order so long as there is one layer of each; particularly, if the heat-curable resin is contained in both the carbon fibers and the carbon nanotube unwoven cloth, a ratio of [number of layers of heat-curable resin-containing carbon fiber prepreg/number of layers of heat-curable resin-containing carbon nanotube unwoven cloth prepreg] in the carbon fiber composite material is preferably 0.5 to 10, more preferably 1.0 to 3.0.

By laminating the heat-curable resin-containing carbon fiber prepreg(s) (or carbon fibers) and the heat-curable resin-containing carbon nanotube unwoven cloth prepreg(s) (or carbon nanotube unwoven cloth(s)), and then carrying out molding via, for example, any one of the molding methods (1) to (4) shown below, there can be obtained a carbon fiber composite material having a desired shape.

(1) Press Molding

Method suitable for mass production, where the prepregs are to be laminated in a mold and cured by heating while applying a pressure thereto.

(2) Autoclave Molding

Method where the prepregs are to be laminated in a forming mold, followed by placing a bagging film thereon so as to perform depressurization, and then curing the prepregs by heating in an autoclave while applying a pressure thereto.

(3) Oven Molding

Method where the prepregs are to be laminated in a forming mold, followed by placing a bagging film thereon so as to perform depressurization, and then curing the prepregs by heating under vacuum pressure.

(4) Sheet-Wrap Molding

Method where the prepregs are to be wrapped around a mandrel and taped, followed by curing the prepregs by heating before removing the mandrel.

As for a heat curing condition in the above molding methods, for example, the temperature is preferably 120 to 250° C., more preferably 140 to 200° C., and the time period is preferably 0.2 to 10 hr, more preferably 0.4 to 5 hr.

Further, as for a pressurizing condition in press molding, for example, the pressure is preferably 1 to 10 MPa, more preferably 3 to 8 MPa.

Various parts can be produced by carrying out processing via these molding methods.

Since the carbon fiber composite material of the present invention is light and superior in electromagnetic wave-shielding property and impact resistance, it can be used in the bodies as well as structural members of vehicles, drones, vessels, airplanes and so on. Further, the carbon fiber composite material of the present invention is also suitable for use in members requiring an electromagnetic wave-shielding property, such as a storage container for a vehicle battery or the like that generates electromagnetic waves, a motor member, and a DC/DC convertor encapsulation material.

Moreover, the carbon fiber composite material of the present invention can also be utilized as a member of or a storage container for a communication device operating at frequencies as high as or higher than those of millimeter waves, that requires an electromagnetic wave-shielding property and a heat resistance.

Since a carbon nanotube unwoven cloth easily produces heat as a result of applying a voltage to both ends thereof, the carbon fiber composite material of the present invention can be used as a heating element for a broad range of purposes.

WORKING EXAMPLES

The present invention is described in greater detail hereunder with reference to working examples; the present invention shall not be limited to these working examples. Here, in the working examples, "parts" refers to "parts by mass."

Materials used in the working and comparative examples of the present invention are as follows.

(1) Bismaleimide Resin (A-1)

Bismaleimide resin represented by the following formula (SLK-3000 by Shin-Etsu Chemical Co., Ltd., number average molecular weight 5,200)

(A-2)

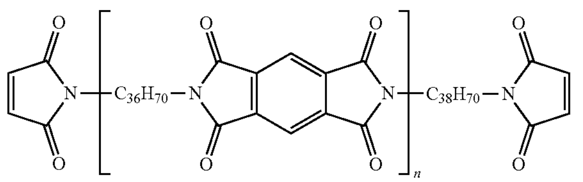

n≈5 (Average value)

Bismaleimide resin represented by the following formula (SLK-6895 by Shin-Etsu Chemical Co., Ltd., number average molecular weight 689)

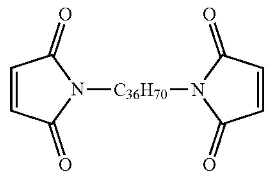

$C_{36}H_{70}$ represents a dimer acid frame-derived hydrocarbon group (2) Epoxy Resin (A-3)

Epoxy resin (ZX-1059 by NIPPON STEEL Chemical & Material Co., Ltd., mixture of bisphenol A-type epoxy resin and bisphenol F-type epoxy resin)

(3) Thermoplastic Resin (A-4)

Polyethersulfone (SUMIKAEXCEL PES5003P by Sumitomo Chemical Co., Ltd.)

Preparation of Resin Film

Resin Film (1)

A bismaleimide resin composition was obtained by mixing 100 parts by mass of the bismaleimide resin (A-1) and 1 part by mass of a curing catalyst (dicumylperoxide "PERCUMYL D" by NOF CORPORATION). A cyclohexanone solvent was then added so that a content of this bismaleimide resin composition would be 50% by mass in the solution obtained, the solution being a cyclohexanone solution (1) of the bismaleimide resin composition. A roller coater was then used to apply the cyclohexanone solution (1) of the bismaleimide resin composition to a PET film of a thickness of 38 μm that had been subjected to a mold release treatment, followed by performing drying at 100° C. for 10 min so as to obtain an uncured resin film (1) having a thickness of 30 μm.

Resin Film (2)

A bismaleimide resin composition was obtained by adding 5 parts by mass of a carbon nanotube powder ZEONANO SG101 (by Zeon Nano Technology Co., Ltd.) to 100 parts by mass of a bismaleimide resin composition containing 100 parts by mass of the bismaleimide resin (A-2) and 1 part by mass of a curing catalyst (dicumylperoxide "PERCUMYL D" by NOF CORPORATION), and then by using a rotating and revolving mixer to mix them at 2,000 rpm for 5 min. A cyclohexanone solvent was then added so that a content of this bismaleimide resin composition would be 50% by mass in the solution obtained, the solution being a cyclohexanone solution (2) of the bismaleimide resin composition. A roller coater was then used to apply this solution to a PET film of a thickness of 38 μm that had been subjected to a mold release treatment, followed by performing drying at 100° C. for 10 min so as to obtain an uncured resin film (2) having a thickness of 30 μm.

Resin Film (3)

An epoxy resin composition was obtained by mixing 100 parts by mass of the epoxy resin (A-3) and 38.3 parts by mass of an aromatic amine curing agent (KAYAHARD AA by Nippon Kayaku Co., Ltd; the amount of 38.3 parts by mass is an amount at which the equivalent of all the amino groups in the aromatic amine curing agent becomes 1.0 per 1 molar equivalent of the epoxy groups in the epoxy resin). Toluene was then added so that a content of this epoxy resin composition would be 50% by mass in the solution obtained, the solution being a toluene solution (1) of the epoxy resin composition.

A roller coater was then used to apply the toluene solution (1) of the epoxy resin composition to a PET film of a thickness of 38 μm that had been subjected to a mold release treatment, followed by performing drying at 120° C. for 10 min so as to obtain an uncured resin film (3) having a thickness of 30 μm.

Resin Film (4)

An epoxy resin composition was obtained by heating and kneading 100 parts by mass of the epoxy resin (A-3), 38.3 parts by mass of an aromatic amine curing agent (KAYAHARD AA by Nippon Kayaku Co., Ltd; the amount of 38.3 parts by mass is an amount at which the equivalent of all the amino groups in the aromatic amine curing agent becomes 1.0 per 1 molar equivalent of the epoxy groups in the epoxy resin), and 20 parts by mass of the polyethersulfone (A-4). Toluene was then added so that a content of this epoxy resin composition would be 50% by mass in the solution obtained, the solution being a toluene solution (2) of the epoxy resin composition.

A roller coater was then used to apply the toluene solution (2) of the epoxy resin composition to a PET film of a thickness of 38 μm that had been subjected to a mold release treatment, followed by performing drying at 120° C. for 10 min so as to obtain an uncured resin film (4) having a thickness of 30 μm.

Carbon Nanotube Unwoven Cloth

Unwoven cloth (1) CNTM30 (multi-walled carbon nanotube by Tortech Nano Fibers) thickness: 78 μm air permeability: 0.01 $cm^3/cm^2 \cdot s$ specific resistance: 1.51E-03 (Ω·cm)

Unwoven cloth (2) CNTM10 (multi-walled carbon nanotube by Tortech Nano Fibers) thickness: 32 μm air permeability: 0.04 $cm^3/cm^2 \cdot s$ specific resistance: 2.22E-03 (Ω·cm)

Unwoven cloth (3) single-walled carbon nanotube unwoven cloth by MEIJO NANO CARBON Co., Ltd.)

thickness: 50 μm air permeability: 0.01 $cm^3/cm^2 \cdot s$ specific resistance: 1.82E-04 (Ω·cm)

Unwoven cloth (4)

A carbon nanotube unwoven cloth (3) was obtained by dispersing 1 g of a single-walled carbon nanotube powder (ZEONANO SG101 by Zeon Nano Technology Co., Ltd., average diameter 3 nm) on both surfaces of 0.3 g of CNTM30. The single-walled carbon nanotube powder was immobilized in an amount of 0.03 g with respect to the 0.3 g of CNTM30.

thickness: 72 μm air permeability: 0.01 $cm^3/cm^2 \cdot s$ specific resistance: 3.0E-03 (Ω·cm)

Unwoven Cloth (5)

A carbon nanotube unwoven cloth composed of single-walled and multi-walled carbon nanotubes was obtained by immersing 0.3 g of CNTM30 in 20 g of a single-walled carbon nanotube solution (EC 1.5 P (NMP solution) by MEIJO NANO CARBON Co., Ltd.) at 25° C. for 30 min, and then performing drying at 200° C. for 5 min.

thickness: 75 μm air permeability: 0.02 $cm^3/cm^2 \cdot s$ specific resistance: 2.4E-03 (Ω·cm)

Prepreg of Carbon Nanotube Unwoven Cloth

Reference Example 1

A piece of the resin film (1) cut out into a size of 10 cm×10 cm and having a thickness of 30 μm and a weight of 0.3 g was placed on both surfaces of 0.23 g of the carbon nanotube unwoven cloth (1) that had a thickness of 78 μm and was 10 cm-squared, followed by laminating them at 80° C. for 1 min, and then pressing them at 150° C. for 15 min, thereby obtaining a carbon nanotube unwoven cloth-based prepreg (CNT1).

Reference Example 2

A carbon nanotube unwoven cloth-based prepreg (CNT2) was obtained in a similar manner as the reference example 1, except that instead of the carbon nanotube unwoven cloth (1) used in the reference example 1, there were used 0.10 g of the carbon nanotube unwoven cloth (2) that had a thickness of 32 μm and was 10 cm-squared.

Reference Example 3

A carbon nanotube unwoven cloth-based prepreg (CNT3) was obtained in a similar manner as the reference example 1, except that instead of the carbon nanotube unwoven cloth (1) used in the reference example 1, there were used 1.5 g of the carbon nanotube unwoven cloth (3) that had a thickness of 50 μm and was 10 cm-squared.

Reference Example 4

A carbon nanotube unwoven cloth-based prepreg (CNT4) was obtained in a similar manner as the reference example 1, except that instead of the carbon nanotube unwoven cloth (1) used in the reference example 1, there were used 0.22 g of the carbon nanotube unwoven cloth (4).

Reference Example 5

A carbon nanotube unwoven cloth-based prepreg (CNT5) was obtained in a similar manner as the reference example 1, except that instead of the carbon nanotube unwoven cloth (1) used in the reference example 1, there were used 0.23 g of the carbon nanotube unwoven cloth (5).

Reference Example 6

A carbon nanotube unwoven cloth-based prepreg (CNT6) was obtained in a similar manner as the reference example 1, except that instead of the resin film (1) used in the reference example 1, there was used the resin film (2).

Reference Example 7

A carbon nanotube unwoven cloth-based prepreg (CNT7) was obtained by immersing the carbon nanotube unwoven cloth (1) in the toluene solution (1) of the epoxy resin composition that had been prepared as above, and then drying the same at 120° C. for 30 min.

Reference Example 8

A carbon nanotube unwoven cloth-based prepreg (CNT8) was obtained by immersing the carbon nanotube unwoven cloth (1) in the toluene solution (2) of the epoxy resin composition that had been prepared as above, and then drying the same at 120° C. for 30 min.

A micrometer was used to measure the thickness of each of the carbon nanotube unwoven cloth-based prepregs CNT1 to CNT8, and an eddy-current method resistance measurement instrument (by NAPSON CORPORATION) was used to measure the apparent resistivity of each of these prepregs. The results thereof are shown in Table 1.

Electromagnetic Wave Shielding Effect

Electromagnetic wave shielding effect (SE) is defined by the following formula.

$$SE = R + A$$
$$= 50 + 10\log(\rho_B f)^{-1} + 1.7t\left(\frac{f}{\rho_B}\right)^{\frac{1}{2}}$$

R: Attenuation by reflection (dB), A: Attenuation by absorption id), $\rho_B$: Volume specific electric resistance (Ω–cm), f: Frequency (MHz), t: Sample thickness (cm)

A large SE value at 80 GHz indicates an excellent electromagnetic wave shielding effect (SE) where a shielding effect is exhibited in a wide frequency range from low to high frequencies.

Impact Strength

An impact strength was measured via a puncture impact test in accordance with a measurement method: JIS K7211.

In the beginning, two layers of the carbon fiber prepreg (1) were laminated together and then heated at 200° C. for 30 min so as to be cured, thereby obtaining a 400 μm-thick cured product of the carbon fiber prepreg (1). An impact test value I of such cured product of the carbon fiber prepreg (1) was measured.

Next, an impact test value II of each sheet produced in the working and comparative examples was measured.

Based on these impact test values I and II, a strength ratio between the two was calculated via a formula: strength ratio of impact test value=impact test value II/impact test value I.

TABLE 1

| Prepreg material | | Reference example 1 | Reference example 2 | Reference example 3 | Reference example 4 | Reference example 5 | Reference example 6 | Reference example 7 | Reference example 8 |
|---|---|---|---|---|---|---|---|---|---|
| Carbon nanotube unwoven cloth prepreg No. | | CNT1 | CNT2 | CNT3 | CNT4 | CNT5 | CNT6 | CNT7 | CNT8 |
| Carbon nanotube unwoven cloth | CNTM30 | ○ | | | ○ | ○ | ○ | ○ | ○ |
| | CNTM10 | | ○ | | | | | | |
| CNT unwoven cloth by MEIJO NANO CARBON | | | | ○ | | | | | |
| Carbon nanotube powder | SG101 | | | | ○ | | ○ | | |
| Carbon nanotube solution | EC1.5P | | | | | ○ | | | |
| Bismaleimide resin | SLK-3000 | 100 | 100 | 100 | 100 | 100 | | | |
| (part by mass) | SLK-6895 | | | | | | 100 | | |
| Epoxy resin (part by mass) | ZX1059 | | | | | | | 100 | 100 |
| Polyethersulfone (part by mass) | PES5003P | | | | | | | | 20 |
| Curing catalyst (part by mass) | PERCUMYL D | 1 | 1 | 1 | 1 | 1 | 1 | | |
| | KAYAHARD AA | | | | | | | 40 | 40 |
| Solvent (part by mass) | Toluene | | | | | | | 140 | 160 |
| Thickness (μm) | | 135 | 90 | 105 | 136 | 138 | 135 | 105 | 115 |
| Apparent resistivity (Ω · cm) | | 3.30E−03 | 4.20E−03 | 3.60E−04 | 3.00E−03 | 2.40E−03 | 2.60E−03 | 3.50E−03 | 3.60E−03 |

Carbon Fiber Prepreg (1) TR3110 381GMX (by Mitsubishi Chemical Corporation)

carbon fiber basis weight: 200 g/m$^2$ epoxy resin content: 40 wt % thickness: 220 μm (2) TR6110H331GMP (by Mitsubishi Chemical Corporation)

carbon fiber basis weight: 280 g/m$^2$ epoxy resin content: 40 wt % thickness: 320 μm

Properties of the sheets produced in the working and comparative examples were measured and evaluated by the following methods, and the results thereof are shown in Tables 2 and 3.

Thickness

Sheet thickness was measured by a micrometer.

Specific Resistance

Specific resistance of the sheet was measured by an eddy-current method resistance measurement instrument (by NAPSON CORPORATION)

Working Example 1

A piece of the carbon fiber prepreg (1) was placed on both the upper and lower surfaces of the carbon nanotube unwoven cloth prepreg (CNT1) produced in the reference example 1 so as to laminate them in three layers. A hot press set to a temperature of 200° C. was then used to pressurize them at a pressure of 7.0 MPa and cure the laminate for 30 min, thereby obtaining a three-layered carbon fiber composite material (electromagnetic wave shielding sheet 1).

The electromagnetic wave shielding effect and impact test strength ratio of this electromagnetic wave shielding sheet 1 are shown in Table 2.

Working Example 2

A piece of the carbon nanotube unwoven cloth prepreg (CNT1) produced in the reference example 1 was placed on both the upper and lower surfaces of the carbon fiber prepreg (1) so as to laminate them in three layers, followed by further placing a piece of the carbon fiber prepreg (1) on both the upper most and lower most surfaces of the three-layered laminate so as to obtain a five-layered laminate. A hot press set to a temperature of 200° C. was then used to pressurize the laminate at a pressure of 7.0 MPa and cure it for 30 min, thereby obtaining a five-layered carbon fiber composite material (electromagnetic wave shielding sheet 2).

The electromagnetic wave shielding effect and impact test strength ratio of this electromagnetic wave shielding sheet 2 are shown in Table 2.

Working Example 3

A piece of the carbon fiber prepreg (2) was placed on both the upper and lower surfaces of the carbon nanotube unwoven cloth prepreg (CNT1) produced in the reference example 1 so as to laminate them in three layers. A hot press set to a temperature of 200° C. was then used to pressurize them at a pressure of 7.0 MPa and cure the laminate for 30 min, thereby obtaining a three-layered carbon fiber composite material (electromagnetic wave shielding sheet 3).

The electromagnetic wave shielding effect and impact test strength ratio of this electromagnetic wave shielding sheet 3 are shown in Table 2.

Working Example 4

A piece of the carbon fiber prepreg (1) was placed on both the upper and lower surfaces of the carbon nanotube unwoven cloth prepreg (CNT2) produced in the reference example 2 so as to laminate them in three layers. A hot press set to a temperature of 200° C. was then used to pressurize them at a pressure of 7.0 MPa and cure the laminate for 30 min, thereby obtaining a three-layered carbon fiber composite material (electromagnetic wave shielding sheet 4).

The electromagnetic wave shielding effect and impact test strength ratio of this electromagnetic wave shielding sheet 4 are shown in Table 2.

Working Example 5

As is the case in the working example 1, a piece of the carbon fiber prepreg (1) was placed on both the upper and lower surfaces of the carbon nanotube unwoven cloth prepreg (CNT3) produced in the reference example 3 so as to laminate them in three layers. A hot press set to a temperature of 200° C. was then used to pressurize them at a pressure of 7.0 MPa and cure the laminate for 30 min, thereby obtaining a three-layered carbon fiber composite material (electromagnetic wave shielding sheet 5).

The electromagnetic wave shielding effect and impact test strength ratio of this electromagnetic wave shielding sheet 5 are shown in Table 2.

Working Example 6

A piece of the carbon nanotube unwoven cloth prepreg (CNT1) produced in the reference example 1 was placed on the upper surface of the carbon fiber prepreg (1) so as to laminate them in two layers. A hot press set to a temperature of 200° C. was then used to pressurize them at a pressure of 7.0 MPa and cure the laminate for 30 min, thereby obtaining a two-layered carbon fiber composite material (electromagnetic wave shielding sheet 6).

The electromagnetic wave shielding effect and impact test strength ratio of this electromagnetic wave shielding sheet 6 are shown in Table 2.

Working Examples 7 to 11

Three-layered carbon fiber composite materials (electromagnetic wave shielding sheets 1 to 7) were obtained in a similar manner as the working example 1 by performing pressurization at a pressure of 7.0 MPa and curing for 30 min with a hot press set to a temperature of 200° C., except that instead of the carbon nanotube unwoven cloth prepreg (CNT1) produced in the reference example 1, there were respectively used the carbon nanotube unwoven cloth prepregs (CNT4 to CNT8) produced in the reference examples 4 to 8.

The electromagnetic wave shielding effects and impact test strength ratios of these electromagnetic wave shielding sheets 7 to 11 are shown in Table 2.

Working Example 12

A piece of the carbon nanotube unwoven cloth (1) was placed on the upper surface of the carbon fiber prepreg (1) so as to laminate them in two layers. A hot press set to a temperature of 200° C. was then used to pressurize them at a pressure of 7.0 MPa and cure the laminate for min, thereby obtaining a two-layered carbon fiber composite material (electromagnetic wave shielding sheet 12).

The electromagnetic wave shielding effect of the electromagnetic wave shielding sheet 12 (value at 80 GHz) was 80 (dB), and the impact test strength ratio thereof was 1.1.

Comparative Example 1

Two layers of the carbon fiber prepreg (1) were laminated together and then heated at 200° C. for 30 min so as to be cured, thereby obtaining a sheet-shaped cured product (sheet 13) having a thickness of 400 μm.

Comparative Example 2

Two layers of the carbon nanotube unwoven cloth prepreg (CNT1) produced in the reference example 1 were laminated together and then heated at 200° C. for 30 min so as to be cured, thereby obtaining a sheet-shaped cured product (sheet 14) having a thickness of 270 μm.

Comparative Example 3

The carbon nanotube unwoven cloth (1) was treated as a sheet 15.

Comparative Example 4

The carbon nanotube unwoven cloth (2) was treated as a sheet 16.

TABLE 2

| | | Working example 1 | Working example 2 | Working example 3 | Working example 4 | Working example 5 | Working example 6 |
|---|---|---|---|---|---|---|---|
| Electromagnetic wave shielding sheet No. | | 1 | 2 | 3 | 4 | 5 | 6 |
| Carbon fiber prepreg | TR3110 | ← | ← | | ← | ← | ← |
| | TR6110H | | | ← | | | |
| Carbon nanotube unwoven cloth prepreg (CNT No.) | | CNT1 | CNT1 | CNT1 | CNT2 | CNT3 | CNT1 |
| Number of layers laminated | | 3 | 5 | 3 | 3 | 3 | 2 |
| Property of electromagnetic wave shielding sheet | Thickness (cm) | 0.046 | 0.082 | 0.054 | 0.040 | 0.043 | 0.035 |
| | Specific resistance (Ω · cm) | 3.50E−03 | 2.80E−03 | 3.20E−03 | 4.20E−03 | 6.80E−04 | 3.70E−03 |
| | Electromagnetic wave shielding effect *1 | 97 | 132 | 103 | 86 | 150 | 83 |
| | Strength ratio via impact test | 1.5 | 2.4 | 1.8 | 1.3 | 1.9 | 1.2 |

| | | Working example 7 | Working example 8 | Working example 9 | Working example 10 | Working example 11 |
|---|---|---|---|---|---|---|
| Electromagnetic wave shielding sheet No. | | 7 | 8 | 9 | 10 | 11 |
| Carbon fiber prepreg | TR3110 | ← | ← | ← | ← | ← |
| | TR6110H | | | | | |
| Carbon nanotube unwoven cloth prepreg (CNT No.) | | CNT4 | CNT5 | CNT6 | CNT7 | CNT8 |
| Number of layers laminated | | 3 | 3 | 3 | 3 | 3 |
| Property of electromagnetic wave shielding sheet | Thickness (cm) | 0.046 | 0.047 | 0.045 | 0.045 | 0.052 |
| | Specific resistance (Ω · cm) | 3.30E−03 | 3.00E−03 | 3.10E−03 | 3.30E−03 | 3.50E−03 |
| | Electromagnetic wave shielding effect *1 | 98 | 101 | 100 | 95 | 93 |
| | Strength ratio via impact test | 1.5 | 1.6 | 1.5 | 1.7 | 1.8 |

*1 Electromagnetic wave shielding effect at 80 GHz (dB)

TABLE 3

| | | Comparative example 1 | Comparative example 2 | Comparative example 3 | Comparative example 4 |
|---|---|---|---|---|---|
| Electromagnetic wave shielding sheet No. | | 13 | 14 | 15 | 16 |
| Carbon fiber prepreg | TR3110 | ○ | | | |
| Carbon nanotube unwoven cloth prepreg | CNT1 | | ○ | | |
| Carbon nanotube unwoven cloth | CNTM30 | | | ○ | |
| | CNTM10 | | | | ○ |
| Number of prepregs laminated | | 2 | 2 | 1 | 1 |
| Property of electromagnetic wave shielding sheet | Electromagnetic wave shielding effect *1 | 70 | 82 | 70 | 50 |
| | Strength ratio via impact test | 1.0 | 0.9 | 0.7 | 0.3 |

*1 Electromagnetic wave shielding effect at 80 GHz (dB)

As shown in the working examples 1 to 12, the impact test strength ratios of the electromagnetic wave shielding sheets of the working examples 1 to 12 to the sheet of the comparative example 1 that was composed of two layers of the carbon fiber prepreg were all 1.0 or larger, which clearly indicates that the sheets of the working examples 1 to 12 were superior in impact resistance. Further, the impact resistances of the electromagnetic wave shielding sheets of the working examples 1 to 12 were also at the same or higher level as compared to the sheet of the comparative example 2 that was composed of two layers of the carbon nanotube unwoven cloth prepreg. In addition, the electromagnetic wave shielding sheets of the working examples 1 to 12 were also superior to the comparative examples 1 and 2 in electromagnetic wave shielding effect at 80 GHz.

The carbon fiber composite material of the present invention serves as a highly-reliable electromagnetic wave shielding sheet with an improved impact strength and an unimpaired electromagnetic wave shielding effect as compared to an electromagnetic wave shielding sheet composed of only carbon fibers.

INDUSTRIAL APPLICABILITY

Since the carbon fiber composite material of the present invention has an excellent electromagnetic wave shielding effect and strength, it is suitable for use in high-speed and high-capacity communication devices, and is suitable for in-vehicle uses.

What is claimed is:

1. A carbon fiber composite material comprising one or more carbon fiber layers and one or more carbon nanotube unwoven cloth layers, wherein at least one of the carbon fiber and carbon nanotube unwoven cloth layers in the carbon fiber composite material is impregnated with a heat-curable resin or has a heat-curable resin film laminated thereon, and wherein an electromagnetic wave shielding effect (SE) value of the carbon fiber composite material at 80 GHz is 83 to 150 dB.

2. The carbon fiber composite material according to claim 1, comprising:

one or more layers of a heat-curable resin-containing carbon fiber prepreg with carbon fibers being impregnated with a heat-curable resin or with a heat-curable resin film being laminated on the carbon fibers; and one or more layers of a heat-curable resin-containing carbon nanotube unwoven cloth prepreg with a carbon nanotube unwoven cloth being impregnated with a heat-curable resin or with a heat-curable resin film being laminated on the carbon nanotube unwoven cloth.

3. The carbon fiber composite material according to claim 2, wherein a ratio of [number of layers of heat-curable resin-containing carbon fiber prepreg/number of layers of heat-curable resin-containing carbon nanotube unwoven cloth prepreg] in the carbon fiber composite material is 0.5 to 10.

4. The carbon fiber composite material according to claim 1, wherein the carbon nanotube unwoven cloth is an unwoven cloth composed of multi-walled carbon nanotubes alone, single-walled carbon nanotubes alone, or a mixture of multi-walled carbon nanotubes and single-walled carbon nanotubes.

5. The carbon fiber composite material according to claim 1, wherein the carbon nanotube unwoven cloth is a carbon nanotube unwoven cloth with a multi-walled carbon nanotube unwoven cloth and a single-walled carbon nanotube unwoven cloth being laminated together.

6. The carbon fiber composite material according to claim 1, wherein the carbon nanotube unwoven cloth has a thickness of not larger than 1 mm, an air permeability of not larger than 0.5 $cm^3/cm^2 \cdot s$, and a specific resistance of not larger than 0.005 Ω·cm.

7. The carbon fiber composite material according to claim 1, wherein an impact test value II/impact test value I is 1.2 to 2.4.

8. The carbon fiber composite material according to claim 7, wherein the impact test value II is that of the carbon fiber composite material, the impact test value I is that of a cured product of a carbon fiber prepreg in which a carbon fiber basis weight is 200 $g/m^2$ and an epoxy resin content is 40 wt %, the impact test values I and II are measured via a puncture impact test in accordance with a measurement method: JIS K7211.

9. The carbon fiber composite material according to claim 1, wherein a thickness of the carbon fiber composite material is 0.035 to 0.082 cm.

10. The carbon fiber composite material according to claim 1, wherein the carbon fiber composite material has 2 to 5 layers consisting of the one or more carbon fiber layers and the one or more carbon nanotube unwoven cloth layers.

11. The carbon fiber composite material according to claim 10, wherein the carbon fiber composite material has three layers consisting of the carbon nanotube unwoven cloth layer, and the carbon fiber layers placed on both the upper and lower surfaces of the carbon nanotube unwoven cloth layer.

12. The carbon fiber composite material according to claim 10, wherein the carbon fiber composite material has five layers consisting of the carbon fiber layer, and the carbon nanotube unwoven cloth layers placed on both the upper and lower surfaces of the carbon fiber layer, and the carbon fiber layers placed on both the upper most and lower most surfaces of the carbon nanotube unwoven cloth layers.

13. The carbon fiber composite material according to claim 10, wherein the carbon fiber composite material has two layers consisting of the carbon nanotube unwoven cloth layer, and the carbon fiber layer placed on one surface of the carbon nanotube unwoven cloth layer.

* * * * *